US 6,700,055 B2

(12) United States Patent  
Barone

(10) Patent No.: US 6,700,055 B2
(45) Date of Patent: Mar. 2, 2004

(54) SELF TRACKING, WIDE ANGLE, SOLAR CONCENTRATORS

(75) Inventor: Steven Barone, Dix Hills, NY (US)

(73) Assignee: BD Systems, LLC, Melville, NY (US)

(*) Notice: Subject to any disclaimer, the term of this patent is extended or adjusted under 35 U.S.C. 154(b) by 0 days.

(21) Appl. No.: 10/198,385

(22) Filed: Jul. 18, 2002

(65) Prior Publication Data

US 2003/0015233 A1 Jan. 23, 2003

Related U.S. Application Data

(63) Continuation of application No. PCT/US01/01755, filed on Jan. 19, 2001.
(60) Provisional application No. 60/177,124, filed on Jan. 20, 2000.

(51) Int. Cl.[7] ............... H01L 31/052; H01L 31/042; F24J 2/08
(52) U.S. Cl. ............ 136/246; 136/259; 136/251; 126/683; 126/698; 126/700; 126/704; 126/705; 257/432; 257/433; 257/436
(58) Field of Search ............. 136/246, 259, 136/251; 126/683, 698, 700, 704, 705; 257/432, 433, 436

(56) References Cited

U.S. PATENT DOCUMENTS

| | | | | | |
|---|---|---|---|---|---|
| 3,018,313 A | * | 1/1962 | Gattone | ........ | 136/246 |
| 3,162,766 A | * | 12/1964 | Ploke | ........ | 250/229 |
| 4,284,839 A | * | 8/1981 | Johnson | ........ | 136/246 |
| 4,411,490 A | * | 10/1983 | Daniel | ........ | 126/648 |
| 4,456,783 A | * | 6/1984 | Baker | ........ | 136/246 |
| 4,867,514 A | | 9/1989 | Waldron | | |
| 4,892,593 A | | 1/1990 | Lew | | |

FOREIGN PATENT DOCUMENTS

| | | | |
|---|---|---|---|
| EP | 51932 | | 5/1982 |
| EP | 0560107 | | 9/1993 |
| JP | 58-48477 A | * | 3/1983 |
| JP | 58-048477 | | 3/1983 |
| JP | 58-92754 A | * | 6/1983 |
| JP | 58-092754 | | 6/1983 |
| JP | 61-272701 A | * | 12/1986 |
| JP | 61-272701 | | 12/1986 |
| JP | 07-260261 | | 10/1995 |
| JP | 7-260261 A | * | 10/1995 |

OTHER PUBLICATIONS

International Search Report PCT/US01/01755, Sep. 25, 2001.

* cited by examiner

Primary Examiner—Alan Diamond
(74) Attorney, Agent, or Firm—Carter, DeLuca, Farrell & Schmidt, LLP

(57) ABSTRACT

A solar concentrator system includes a collector lens for collecting and at least partially focusing incident solar rays, a solar cell and a lens array positioned generally between the collector lens and the solar cell, the lens array directing the partially focused rays emerging from the collector lens onto the solar cell.

14 Claims, 4 Drawing Sheets

SELF TRACKING, WIDE ANGLE, SOLAR CONCENTRATORS

RELATED APPLICATIONS

This application is a continuation of International Application No. PCT/US01/01755 filed Jan. 19, 2001, which claims the benefit of U.S. Provisional Application No. 60/177,124 filed Jan. 20, 2000, the disclosures of which are both incorporated herein by reference.

BACKGROUND OF THE INVENTION

1. Field of the Invention

The present invention relates generally to solar concentrators, and more particularly to a wide angle, self tracking solar concentrator.

2. Description of the Related Art

Solar concentrators collect sunlight over some area and direct the sunlight onto a (photovoltaic) solar cell of much smaller area. In this way, the optical power incident on a relatively large area is collected and converted to electrical power, at some efficiency, by a relatively small solar cell. The solar cell is typically based on crystalline silicon or gallium-arsenide. One reason for employing a concentrator is that solar cells are currently the most expensive component of photovoltaic arrays on a per unit area basis. Another reason is that photovoltaic materials are more efficient at higher power levels than that of ordinary sunlight.

Typical prior art solar concentrators employ a Fresnel lens to focus incident sunlight onto the solar cell. If the Fresnel lens and solar cell are stationary as the sun moves overhead, the focal spot will move across and eventually off of the small solar cell. In other words, the field of view of the optical system is very limited. In order to compensate for this limitation, concentrator systems are typically designed to track the sun, i.e. the optic axis of the system is continuously or periodically mechanically adjusted to be directed at the sun throughout the day and year. However, such periodical mechanical adjustments require a relatively complex, costly structure. In addition, power is required to make the adjustments, thereby reducing the overall efficiency of the system.

SUMMARY OF THE INVENTION

The present invention is directed to a self tracking solar concentration which employs at least one collector lens to at least partially focus incident sunlight onto at least one array of lens elements, such as, for example, a Fresnel lens array. Each element of the lens array is preferably smaller than the collector lens. As the sun moves overhead, the partially focused sunlight moves across each element of the lens array. For a particular angular position of the sun, a respective element of the lens array focuses the incident sunlight onto one edge of the solar cell. As the angular position of the sun changes, the focal spot moves across the surface of the solar cell and eventually off the opposite edge of the cell. As this occurs the partially focused beam moves across the element of the lens array and onto an adjacent element. This latter element of the lens array keeps the final focal spot on the surface of the solar cell for a contiguous range of angular motion of the sun. Thus, the solar concentrator described herein effectively tracks the sun without requiring mechanical motion of the system and provides a significantly broader field of view than conventional solar concentrators. This broad field of view advantageously directs sunlight which is scattered or diffused before reaching the surface of the solar panel onto the solar cell. In the most direct implementations of the present invention, the field of view of the system is effectively divided into angular sectors each one of which employs one element of the lens array to keep the focused radiation on the surface of a solar cell for a range of angles. Ordinarily the system will be designed so that these angular ranges are contiguous in order to maximize the collection of both direct, scattered, and diffused sunlight.

In alternative embodiments, an array of collector lenses, an array of lens arrays and/or an array of solar cells is employed in the solar concentrator described herein.

BRIEF DESCRIPTION OF THE DRAWINGS

The features and advantages of the disclosed optical concentrator will become more readily apparent and may be better understood by referring to the following detailed descriptions of illustrative embodiments of the present invention, taken in conjunction with the accompanying drawings, in which.

DETAILED DESCRIPTION OF THE PREFERRED EMBODIMENTS

Figure 1:
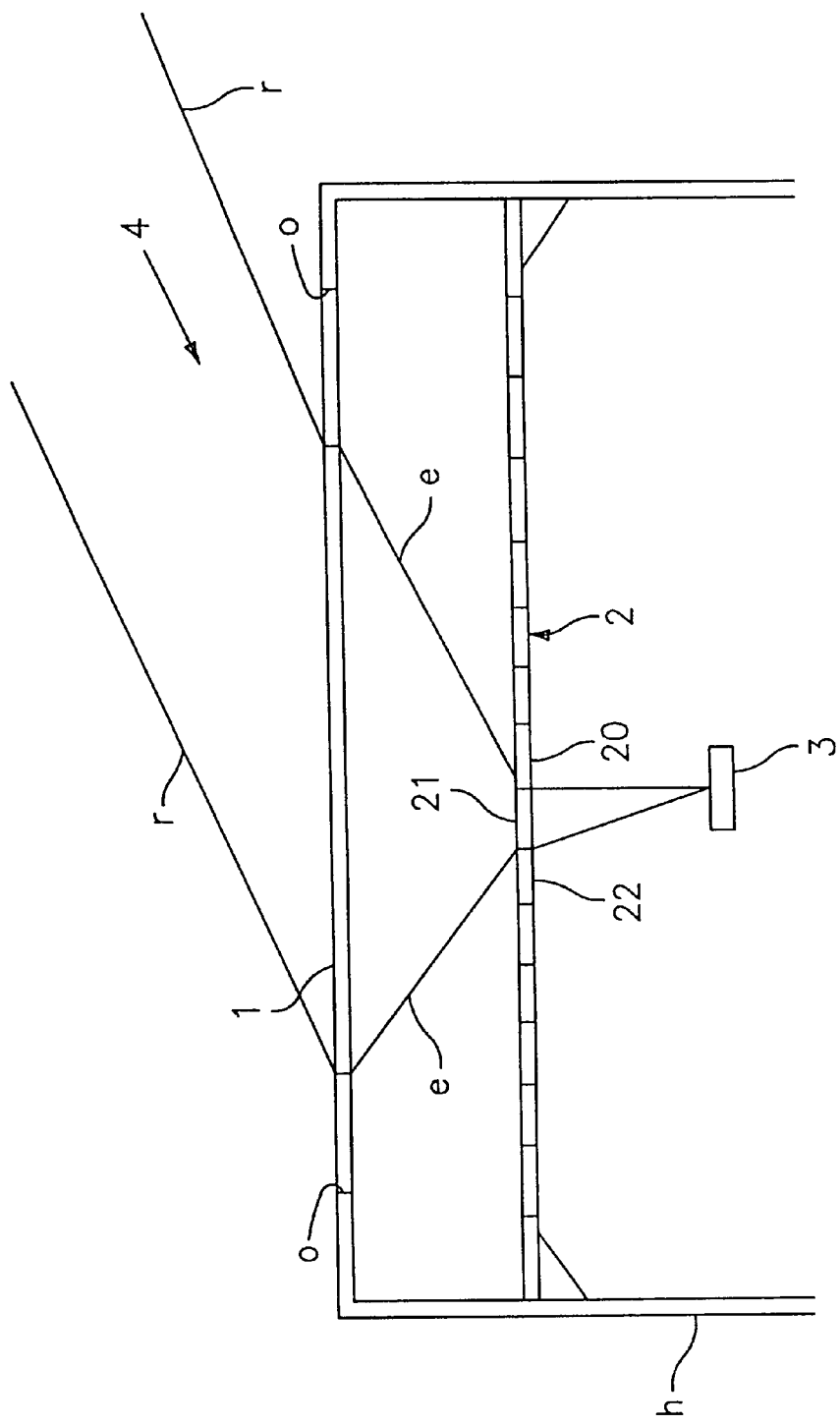
FIG. 1 is a schematic side view illustrating a solar concentrator in accordance with an embodiment of the present invention.

Turning now to the drawings, in which like reference numerals identify similar or identical elements throughout the several views, FIG. 1 illustrates, in a schematic side view, one embodiment of the present invention. Housing "h" houses the components of the optical system and defines an opening "o" to receive incident sunlight. It should be understood that any support means (such as, for example, a framework, scaffolding, or housing) or combination of support means can be used to support the various components of the present solar concentrators. The choice of any particular support means or combination of support means will depend on the size and configuration of the solar concentrator. A collector lens 1, which in the preferred embodiment is a Fresnel lens, spans opening "o" and collects incident sunlight rays "r" and at least partially focuses the incident sunlight rays 4 onto part of one element 21 of lens array 2. As used herein, the term "array" includes both one and two dimensional arrays. Lens array 2 preferably is a Fresnel lens array. The focal plane of collector lens 1 may be on either side (e.g., above or below) lens array 2. Array 2, in turn, focuses the emerging radiation or rays "e" from lens 1 onto the surface of solar cell 3. The function of the element 21 of array 2 is to keep the focal point of the radiation on the surface of the solar cell as the sun moves through a small predetermined angle of movement from east to west. Eventually, as the sun moves further, the partially focused beam moves onto the next adjacent element 20 of array 2. This element 20 of array 2 then directs the emerging rays "e" on a focal spot on the surface of the solar cell 3 for the next contiguous range of east-west angular positions of the sun. It should, of course be understood that whether the partially focused beam moves toward element 20 or 22 of array 2 depends on the orientation of the device relative to the movement of the sun. Each element of lens array 2 keeps the focal spot on the surface of the solar cell 3 for one of a set of contiguous predetermined angular ranges of the position of the sun. Thus all, or substantially all, of the optical power incident on the lens 1 is focused into a single focal spot on the surface of the solar cell 3 for a wide range of angles as the east-west angular location of the sun varies.

In order to accommodate yearly, north-south, angular variations of the location of the sun, a number of Fresnel lens arrays 2a–2d arranged in side by side relation can be employed as shown in more detail in FIG. 4, described below. Each lens array 2a–2d includes one or more elements (20a14 22a, 20b14 22b, 20c14 22c and 20d14 22d, respectively) which are optically similar or even identical.

Figure 2:
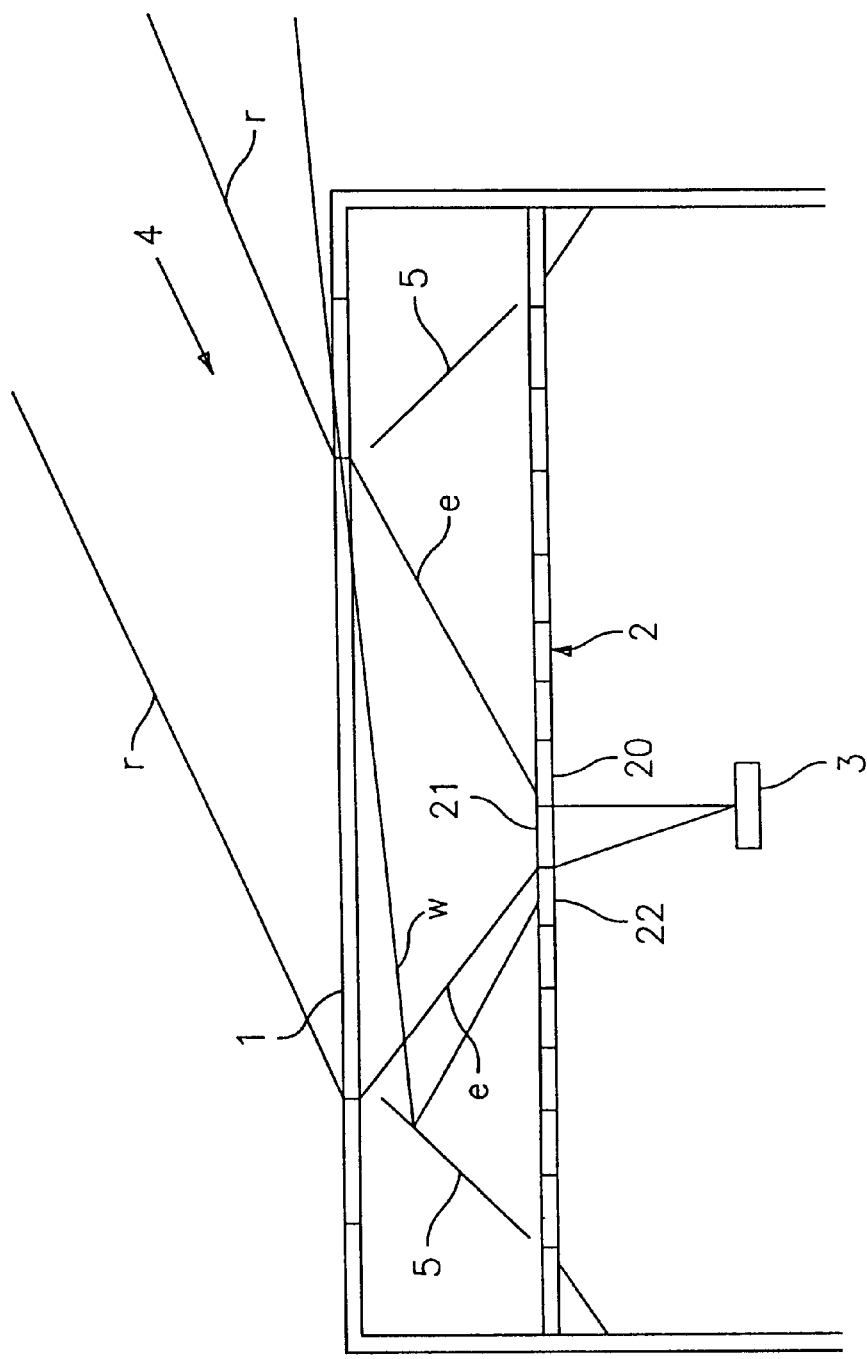
FIG. 2 is a schematic side view illustrating an alternative embodiment of the present invention which includes means for directing wide angle radiation onto the elements of the lens array which are closer to the center of the system than the directing means.

FIG. 2 is a schematic drawing illustrating an alternative embodiment of the present invention which is a variation of the embodiment illustrated in FIG. 1. The new feature is the addition of directing means (e.g., mirrors, prisms, such as, for example, right angle prisms, etc.) 5 to re-direct very wide angle sunlight rays "w" towards the center of the system where it is more easily focused onto a solar cell 3 by an element, e.g., 22 of lens array 2. In some applications, improved performance can be obtained by dividing collector lens 1 into a number of segments, employing array elements on array 2 which are smaller than the beam width, or employing more than one solar cell 3.

Figure 3:
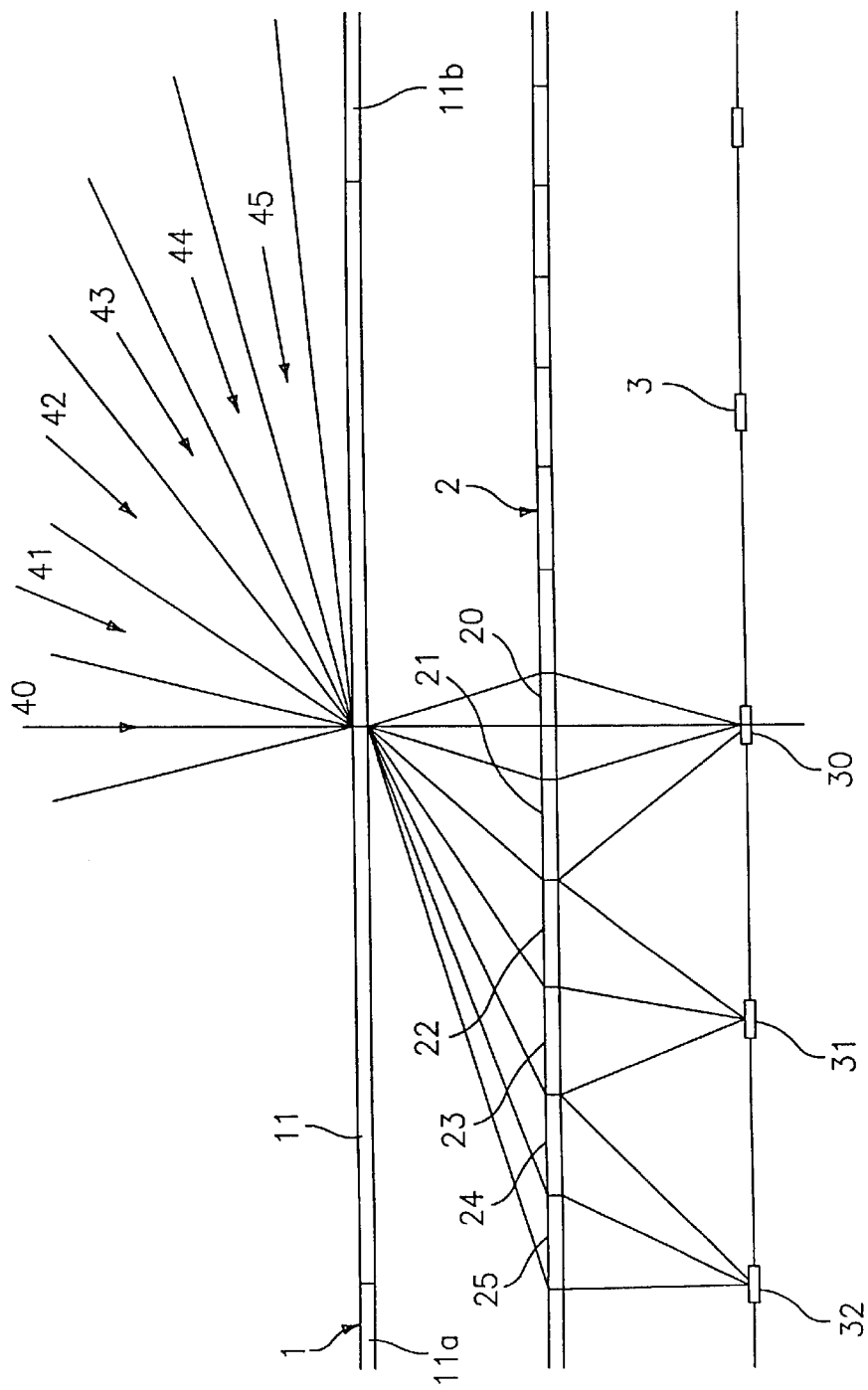
FIG. 3 is a schematic side view illustrating still another embodiment of the present invention which employs an array of solar cells.

FIG. 3 is a schematic drawing illustrating another embodiment of the present invention which consists of a first array of collector lenses 1, e.g., Fresnel lenses, and a second array 2 of Fresnel lenses and an array of (photovoltaic) solar cells 3. Sunlight is incident on the first array of lenses 1. Array 1 consists of one or more elements (11, 11a, 11b) which are optically similar or even identical. The optical behavior of one element 11 of the first array is illustrated in the figure. The field of view is divided into a number of angular sectors, e.g. 40, 41, 42, 43, 44, 45. This system is symmetric across the vertical center line of the figure. Sunlight in the angular sector 40, for example, incident on the array element 11 of the first lens array 1 is partially focused onto the array element 20 of the second Fresnel lens array 2. The width of the partially focused beam on the second Fresnel array 2 may be greater than, less than or equal to the width of each element of array 2. Also the focal plane of Fresnel lens element 11 may be either above or below the second lens array 2. Array element 20 focuses the partially focused incident radiation onto solar cell 30. Similarly sunlight in the angular sector 41 incident on the array element 11 of the first Fresnel lens 1 is partially focused onto the array element 21 of the second Fresnel lens array 2. This array element 21 also focuses the partially focused radiation onto the solar cell 30. Radiation in the angular sectors 42 and 43 incident on the array element 11 of the first Fresnel lens array 1 is partially focused onto elements 22 and 23, respectively of the second Fresnel lens array 2 and then onto the solar cell 31. Finally, radiation in the angular sectors 44, and 45 incident on the array sector 11 of the first Fresnel lens array 1 is partially focused onto the elements 24 and 25 of the second Fresnel lens array 2. These elements in turn focus the partially focused radiation onto solar cell 32.

The number, size, location, and optical characteristics of the elements of lens array 2 as well as the number of elements in the solar cell array 3 corresponding to one element of the lens array 1 can be optimized for cost, optical and electrical efficiency, angular field of view, and other parameters of the system. Further, the configuration of FIG. 3 can optionally be supplemented with directing means (e.g., mirrors, prisms, etc.) as in FIG. 2. As noted previously, yearly north-south variations in the angular position of the sun can be accommodated by employing multiple rows of Fresnel lens arrays of type 2 as disclosed schematically in FIG. 4. Additionally, while FIG. 3 illustrates a one dimensional array, the same principles and constructions may be applied to realize a two dimensional array.

Figure 4:
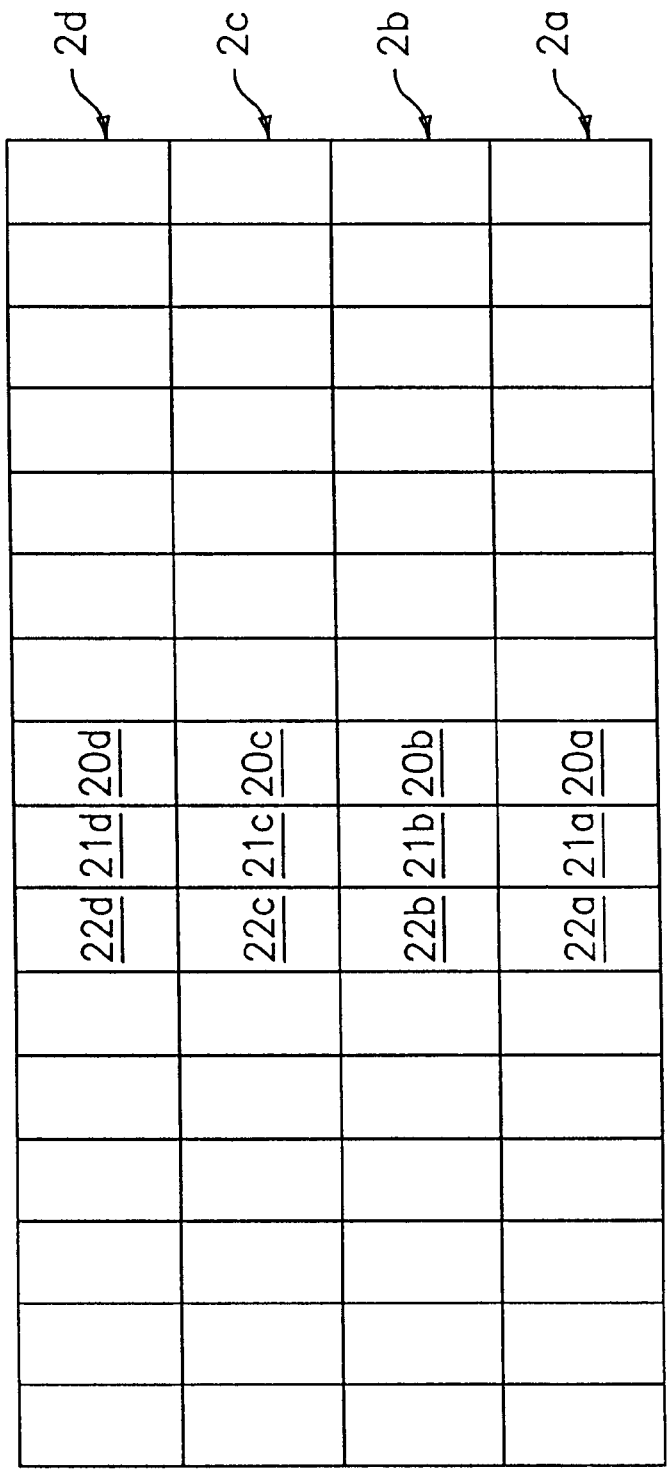
FIG. 4 is a top schematic view of a plurality of lens arrays arranged in side by side relation which can be used in alternate embodiments in place of single lens array 2.

FIG. 4 is a schematic view depicting an embodiment that includes multiple lens arrays 2a–2d in side by side relation. The field of view of each individual row is a fixed north-south angular sector. By employing a number of rows each with a different fixed north-south angular field of view, the north-south field of view of the total system can be made equal to the yearly, apparent north-south excursions of the sun or even greater. As described above, each lens array 2a–2d includes one or more elements 20a14 22a, 20b14 22b, 20c14 22c and 20d14 22d, respectively, which are optically similar or even identical.

As will be understood by those skilled in the art, various modifications in form and detail may be made therein without departing from the scope and spirit of the present invention. For example, non-Fresnel lenses may be used in some locations, movable or adjustable lenses, mirrors, and prisms, with appropriate structure or control mechanisms, may be employed as the internally disposed means for directing received radiation in a small angular range onto a solar cell. Further, it is not necessary that all or any of the arrays employ elements which are all of the same size. The optimum configuration may contain lens arrays which are significantly non-periodic in size and/or other characteristics. Clearly each element must have different optical characteristics. In one embodiment the second lens does not have separate elements but rather a continuous variation in optical properties. This may be approximated by a Fresnel lens. Further, any or all of the Fresnel lenses may be replaced by non-Fresnel lenses, microlenses, or optical elements designed on the basis of the principles of diffractive optics. Accordingly, modifications such as those suggested above, but not limited thereto, are to be considered within the scope of the invention.

Ordinarily, but not necessarily, the system disclosed herein will be incorporated into a framework with a glass cover which may or may not have an associated tracking system and inverter. Some designs will require a cooling system for the solar cells in order to keep their operating temperature in the optimum range of electrical efficiency. Finally, it is possible to replace the solar cells by thermally absorbing material to generate heat rather than electrical power. The thermal energy can then be used directly for heating applications or to generate electrical power.

Furthermore, multiple solar concentrators in accordance with the present disclosure can be combined into a one or two dimensional array to form solar modules, panels and/or arrays.

While the above description contains many specifics, these specifics should not be construed as limitations on the scope of the disclosure, but merely as exemplifications of preferred embodiments thereof. Those skilled in the art will envision other modifications within the scope and spirit of the claims appended hereto.

What is claimed is:

1. A solar concentrator system comprising:
   at least one collector lens for at least partially focusing incident solar radiation, each collector lens having an area;

photovoltaic material having an area less than the area of the at least one collector lens;

at least one intermediate array of lenses positioned between the at least one collector lens and the photovoltaic material, each intermediate array of lenses including elements, each element of the intermediate array of lenses directing the at least partially focused solar radiation emerging from the at least one collector lens onto the photovoltaic material, wherein as a solar source moves across the solar concentrator system the partially focused solar radiation moves from one element of the intermediate array of lenses onto an adjacent element of the intermediate array of lenses to maintain the partially focused solar radiation directed onto the photovoltaic material; and a housing having an opening for receiving incident solar radiation, the housing supporting the at least one collector lens adjacent the opening, the photovoltaic material and the at least one intermediate array of lenses.

2. The solar concentrator system according to claim 1 further including directing means for directing the at least partially focused radiation emerging from the at least one collector lens generally towards the location of the photovoltaic material to be received by the at least one intermediate array of lenses, the directing means being positioned between the at least one collector lens and the elements of the at least one intermediate array of lenses.

3. The solar concentrator system according to claim 2 wherein the directing means includes at least one mirror.

4. The solar concentrator system according to claim 2 wherein the directing means includes at least one prism.

5. The solar concentrator system according to claim 1 wherein the photovoltaic material includes a plurality of solar cells.

6. The solar concentrator system according to claim 1 wherein the at least one collector lens includes an array of collector lenses.

7. The solar concentrator system according to claim 1 wherein the at least one collector lens comprises a Fresnel lens.

8. The solar concentrator system according to claim 1, wherein the intermediate array of lenses between the at least one collector lens and the photovoltaic material comprises an array of Fresnel lenses.

9. The solar concentrator system according to claim 1 including a plurality of intermediate arrays of lenses arranged in side by side relation, the plurality of intermediate arrays of lenses being positioned between the at least one collector lens and the photovoltaic material.

10. The solar concentrator system according to claim 1 wherein at least one of the collector lenses and one of the lenses in the intermediate array of lenses between the collector lenses and the photovoltaic material is a Fresnel lens.

11. The solar concentrator system according to claim 10 wherein each Fresnel lens of the collector lenses is larger than each element of the intermediate array of lenses.

12. The solar concentrator system according to claim 10 wherein the photovoltaic material comprises a plurality of solar cells.

13. The solar concentrator system according to claim 1, further comprising:

a first array of lens elements to at least partially focus incident solar radiation;

an array of solar cell elements; and an array of Fresnel lens arrays, each array of Fresnel lens arrays including a plurality of elements, the array of Fresnel lens arrays being positioned to receive at least partially focused radiation emerging from the first array of lens elements, each element of each array of Fresnel lens arrays directing at least partially focused solar radiation emerging from the first array of lens elements onto at least one of the solar cell elements in the array of solar cell elements.

14. The solar concentrator system according to claim 13 wherein the first array of lens elements is a Fresnel lens array.

* * * * *